INVENTORS.
RAYMOND I. RAPP
WILLIAM R. PETERSON
THEMIS C. PAILAS
BY Themis C. Pailas

ATTORNEY.

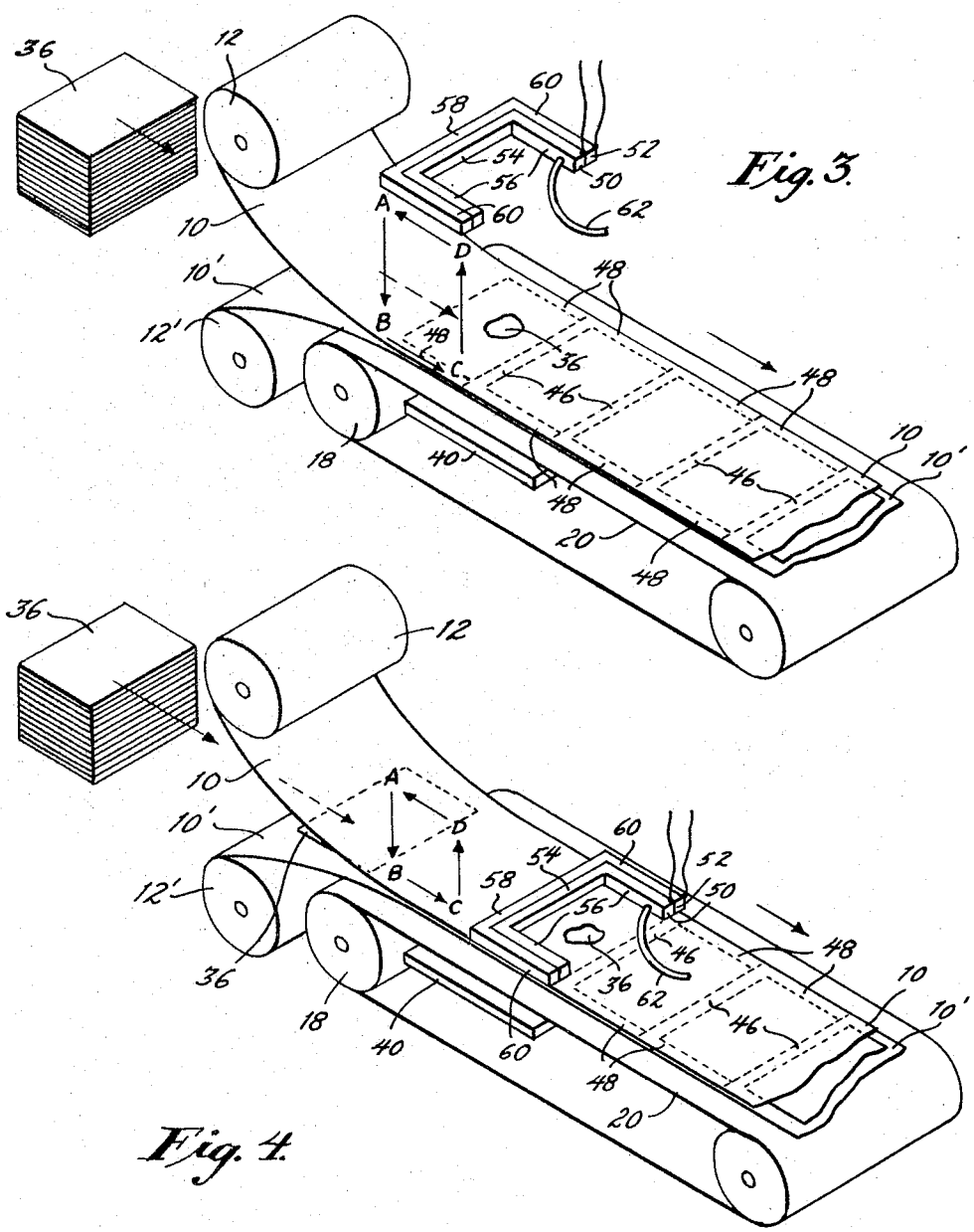

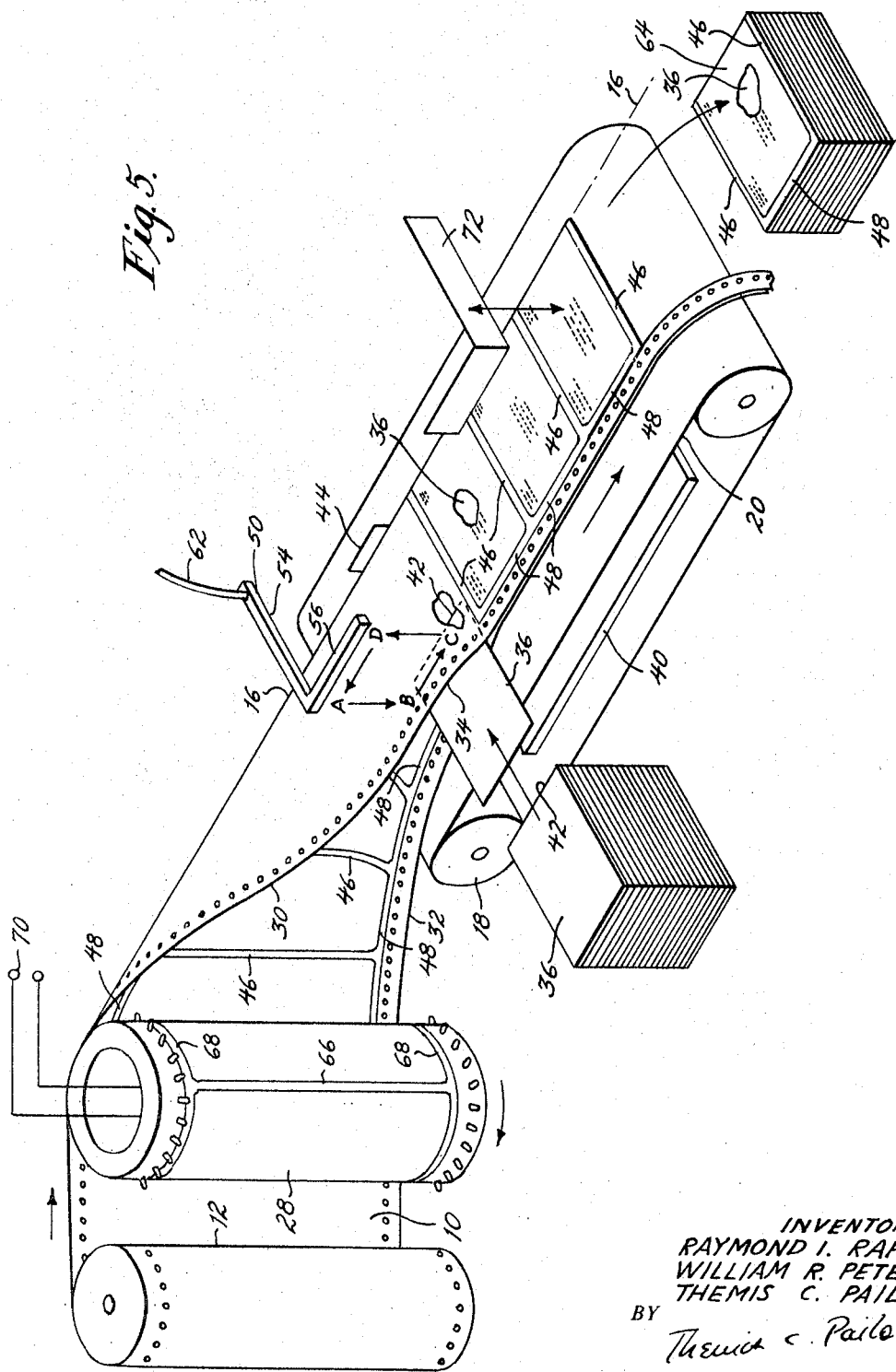

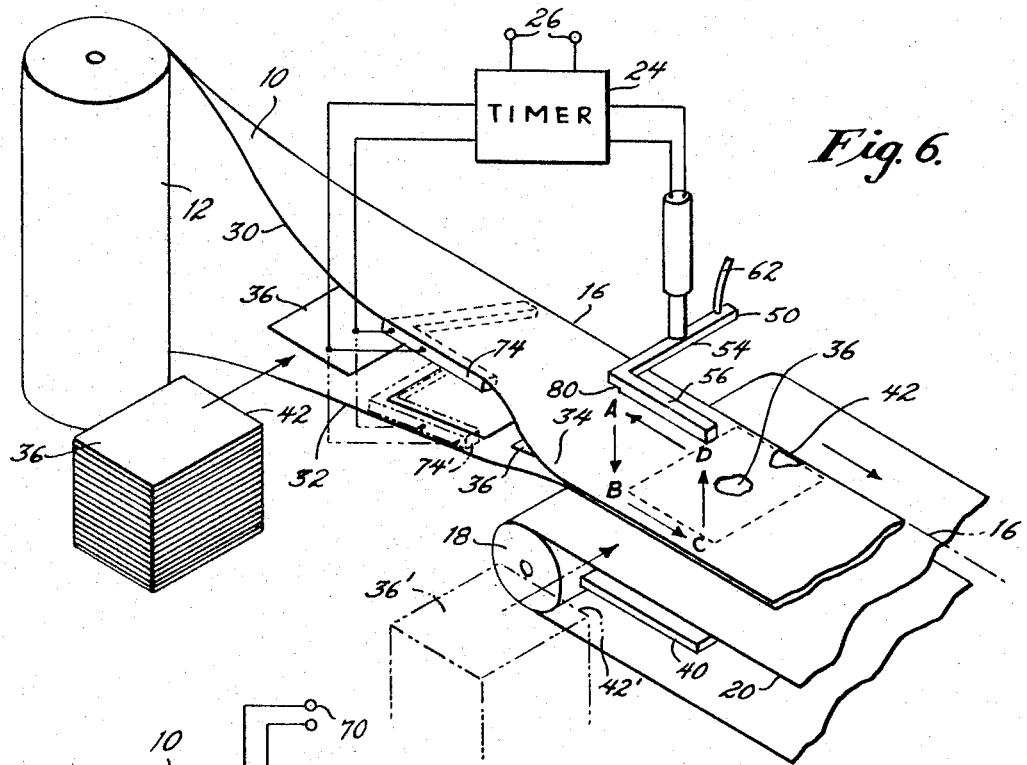
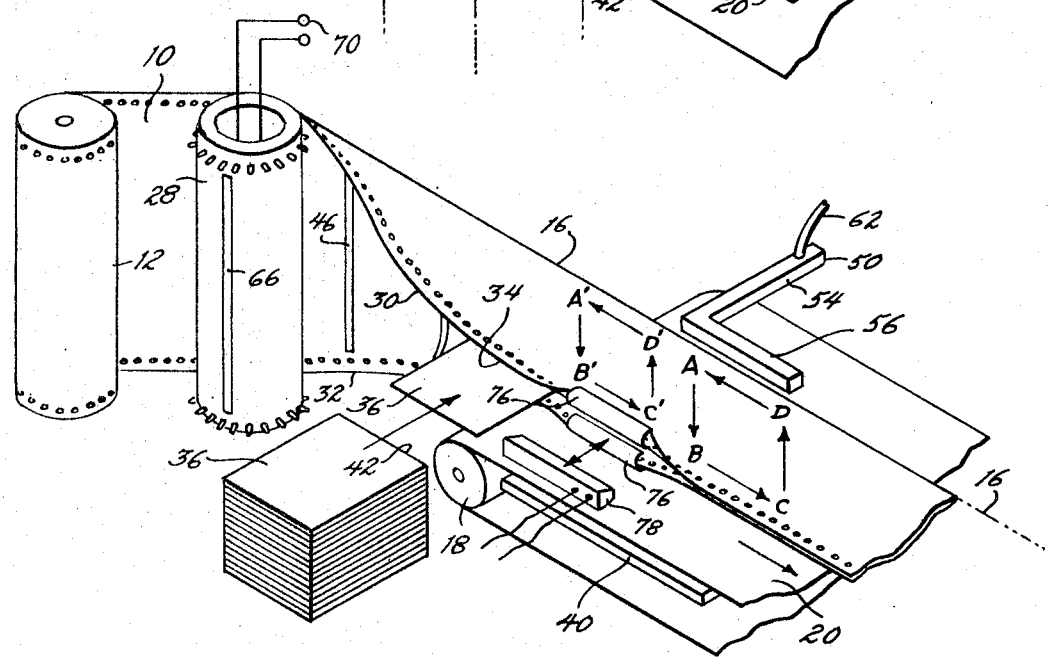

United States Patent Office 3,339,337
Patented Sept. 5, 1967

3,339,337
ENVELOPE, APPARATUS AND METHOD FOR MAKING AND FILLING ENVELOPES
Raymond I. Rapp, 7841 Ridge Ave., Philadelphia, Pa. 19128; and William R. Peterson, 29 Hamilton Road, and Themis C. Pailas, 31 Hamilton Road, both of Ambler, Pa. 19002
Filed Oct. 8, 1964, Ser. No. 402,398
5 Claims. (Cl. 53—180)

This invention relates to the manufacture and filling of envelope-type packages from roll stock and to an envelope-type package produced thereby. More particularly, the invention involves a novel method of continuously making envelope-type packages from roll stock and filling said packages by inserting relatively flat material therein prior to final sealing. The novel envelope-type package according to the invention is the relatively thin, strong envelope and the tightly enveloped package resulting from the novel insertion and sealing.

Historically, it has been an objective of industry to reduce the cost of volume mailings and packaging in general by large firms, mail order houses and publications by lowering envelope and packaging costs as well as the cost of insertion. Various methods, systems and machines have been utilized in an attempt to accomplish these objectives without detracting from the final attractive appearance of the ultimate mailing piece. This invention has therefore, as a primary object, the elimination of many of the earlier drawbacks and limitations of volume mailings and the provision of a relatively strong, thin envelope for a tightly enclosed package or mailing piece of varying thickness to accomplish the historical aims and objectives outlined above.

Another object of the invention is to provide a novel, fast method for feeding literature or other relatively flat material for insertion into partially formed envelopes and thereafter enclosing or enveloping such contents with a strong, tight, form-fitting seal along the periphery thereof.

Still another object of the invention is to provide a novel method of using roll stock of relatively thin, inexpensive plastic or other film to continuously form, envelope and seal intermittently fed filler material using heat and pressure means operable to accomplish the sealing.

Yet another object of the invention is to provide a fast method of making envelopes from roll stock by rapidly forming a relatively strong peripheral seal using heat actuated means.

Still another object of the invention is to provide a fast method of using roll stock coated with pressure-sensitive adhesive to form a relatively tight, form-fitting envelope containing material fed intermittently between opposed sheets of said stock.

Another object of the invention is to provide a method of making envelopes using the heat seal principle in conjunction with pressure means to accomplish a relatively strong, form-fitting seal along the periphery of relatively flat inserts.

Another object of the invention is to provide a novel method of heating an inner surface of film to be sealed to reduce the subsequent setting time of the seal and retain the maximum, initial film strength.

Still another object of the invention is to provide a novel method of using cooperating heat and pressure means to rapidly accomplish heat sealing of film-enveloped material.

Still another object of the invention is to provide a novel method of accelerating the cooling of the heat-sealed periphery of an envelope to quickly develop the ultimate bond strength of the seal.

Yet another object of the invention is to provide a method of rapidly making a relatively strong heat seal along the immediate periphery of an insert.

Still another object of the invention is to provide a method of applying and maintaining pressure proximate to a heat-sealed area during motion of the area in a continuous, envelope-forming process to obtain the maximum bond strength of the seal.

Still another object of the invention is to provide a novel machine using roll stock to continuously form envelopes by applying heat along predetermined lines of an inner surface of said stock and pressure along said predetermined lines from an outer surface of said stock.

Yet another object of the invention is to provide a novel envelope formed from a relatively thin film of heat sealable stock along at least one peripheral edge and with the controlled application of heat having been made to an inner surface of said edge in such manner as to have retained the maximum integral film strength proximate said edge after sealing.

Still another object of the invention is to provide a novel machine and method for forming a relatively tight, inexpensive plastic envelope around a relatively flat insert without the use of comparatively expensive heat shrinkable film and the heat shrink process.

These and other objects, features and advantages of the invention will hereinafter more fully appear from the following detailed description thereof, taken in connection with the accompanying drawings in which the same characters of reference are employed to indicate corresponding or similar parts throughout the several figures thereof:

FIGURE 3 is a view similar to FIGURE 1, but illustrating another embodiment of a machine and method using a pair of rolls to feed opposed single webs of envelope material.

FIGURE 4 is a similar view of the embodiment illustrated in FIGURE 3 showing the advanced position of the sealing head after the steps of insertion, sealing and transport performed on a single envelope unit.

FIGURE 5 is a view similar to FIGURE 1, but illustrating in another embodiment the progress of a web of envelope material through the machine and the subsequent envelopment of intermittently fed inserts and conversion into sealed envelopes containing said inserts.

FIGURE 6 is a view similar to FIGURE 1, but illustrating other embodiments of a machine and method using different envelope sealing means and technique.

FIGURE 7 is another view similar to FIGURE 1, but illustrating another embodiment of a machine and method using still different sealing means and technique.

Figure 1:
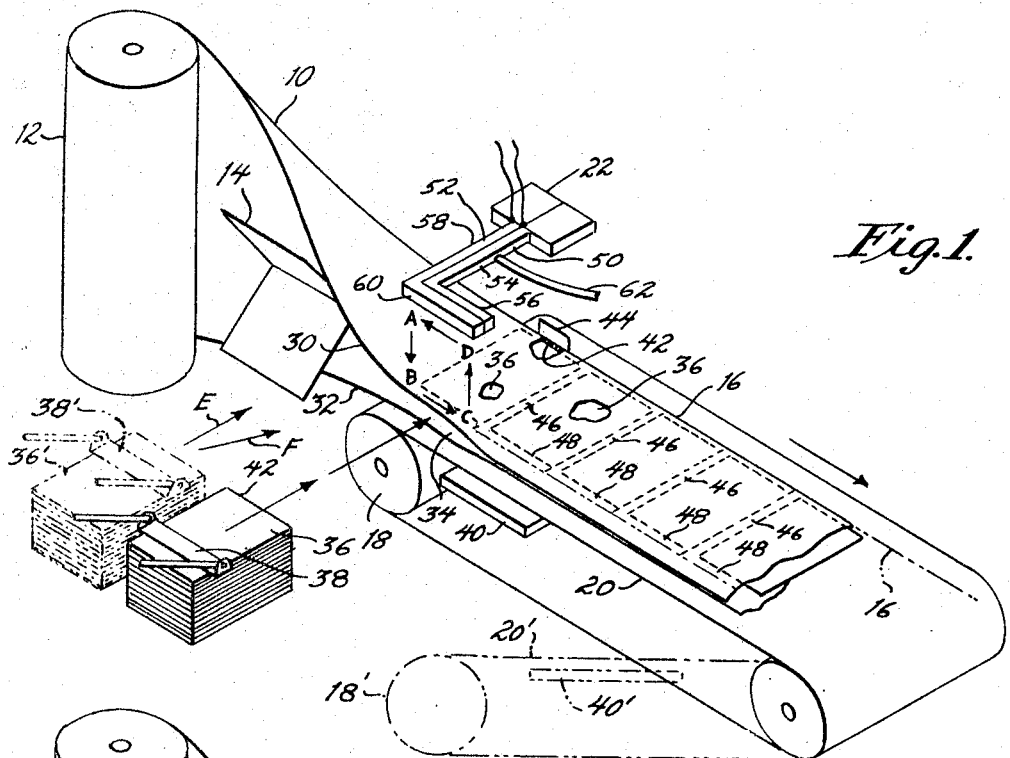
FIGURE 1 is a perspective more or less diagrammatic view illustrating one embodiment of the envelope making a filling machine and the steps according to the invention, with certain parts omitted.
Figure 2:
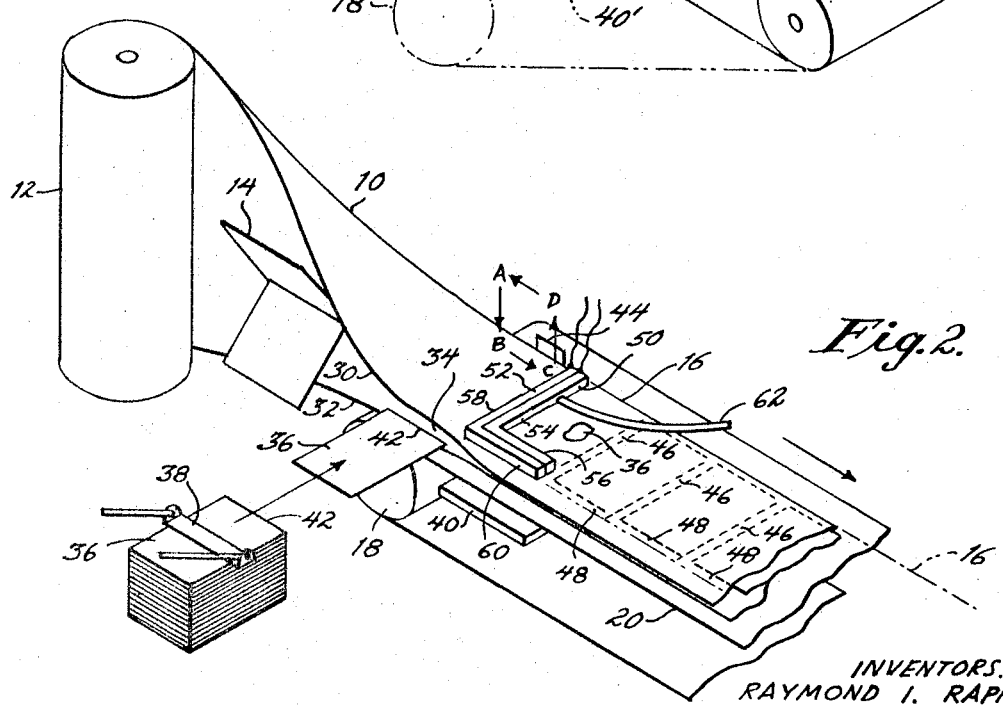
FIGURE 2 is a fragmentary view of FIGURE 1 showing the advanced position of the sealing head after the steps of insertion, sealing and transport performed on a single envelope unit.

Referring to FIGURES 1 and 2, a plane web 10 is shown unwinding from its original roll 12, and being drawn over a suitable form guide 14, by which the web 10 is folded substantially along the longitudinal center or other fold line 16. Rotatably driven rolls 18 advance the silicone rubber or Teflon coated (or other suitable material) conveyor belt 20 and thereby the web 10 in predetermined synchronism with the operating cycle of the sealing head 22 by well known means (not shown) such as the timer 24 illustrated in FIGURE 6 and energized as suggested by the current source 26 therein.

For convenience of illustration and economy of manufacture, the feeding configurations are preferably marginally punched holes in the web 10 for engagement of a travelling pin type feeding device, as shown in FIGURES 5 and 7. However, they may be notches, indentations, tongues, or other formations or means including friction suitable for engagement of a corresponding positive feeder such as the combination heater and feeder rolls 28 as illustrated, or a suitable feeder associated with the conveyor belt 20 (not shown).

Consequent to folding, one marginal edge portion 30 of the travelling web 10 is brought into overlying relationship with the other marginal portion 32 to form a succession of open pockets 34 into which filler material or inserts 36 are inserted by well known instrumentalities 38 proximately disposed, and thereafter closed and sealed by means associated with the head 22 and cooperating with either a relatively rigid conveyor belt 20 alone or in combination with the bed or platen 40 as described in detail, hereinafter. A hydraulic or air jack or other known devices (not shown) may be used to tilt the conveyor assembly including the belt 20, the roll 18 and the platen 40, from the relatively upright position illustrated to the horizontal position shown in phantom thus changing the present embodiment from a slanted or angular fed machine to a flat-bed sealer or enveloper. Accordingly, the inserter 38 may be so positioned as to direct the inserts 36 between the marginal or edge portions 30 and 32, respectively, with the far edge 42 squarely against the web fold line 16 restrained by the guide 44 to thereafter fall by gravity against previously adhesively or otherwise sealed transverse stripes 46 along which the one portion 30 is united with the other portion 32 of the web 10 to form what is initially a normal bottom edge and finally after closing and sealing also becomes a normal top edge of a completed envelope after it is severed or parted from its adjacent envelope units substantially along a line constituting the median of the transverse stripe 46. Alternately, the inserter 38 may direct inserts against the last-formed normal bottom edge or stripe generally designated by the reference character 46 to insure that after closing and sealing the normal top edge or stripe 46 each insert is confined within a relatively tight envelope owning to its initial insertion against both the fold line 16 and the normal bottom edge 46. As described in detail hereinafter, the improved, form fitting closing and sealing of the normal top edge 46 and the longitudinally extending marginal stripes 48, which may meet the transverse stripes 46, also serve to produce a relatively tight envelope unit about each insert. Although the inserter 38 is illustrated only in the embodiment in FIGURES 1 and 2, it is nevertheless incorporated in the other embodiments herein.

When the conveyor assembly is in the horizontal position as shown in phantom in FIGURE 1, the inserter 38' may be positioned as shown in phantom to the left of the sealing head 22 to permit inserts 36' to be directed as indicated by the arrow F against the last formed transverse stripe 46 regardless of the cycle position of the sealing head 22, as explained in detail hereinafter.

For convenience of illustration the sealing head 22 is shown only in FIGURE 1 although each of the embodiments incorporates such a head from which depends an L or U shaped clamping or pressure bar 50 and also, in the embodiments in FIGURES 1 and 3, an L shaped and U shaped heat sealing wire or bar 52, respectively. Each of the pressure bars 50 is provided with a horizontal portion or leg 54 which extends transversely of the web 10 and a vertical portion or leg 56 which extends longitudinally of the web adjacent the marginal portions 30 and 32. As illustrated, each of the sealing bars 52 is provided with a horizontal portion or leg 58 contiguous to the leg 54, and a vertical portion or leg 60 contiguous to the leg 56 of the pressure bar 50. Suitable insulating means (not shown) such as a strip of mica is disposed between the contiguous legs of the pressure bar 50 and the sealing bar 52 during the operating cycle to reduce the amount of heat which would otherwise be transferred therebetween. To facilitate the dissipation of incident heat, the pressure bar 50 is provided with suitable refrigerating means such as the tube 62 which conducts a refrigerant through the horizontal legs 54 and the vertical legs 56. Moreover, the bottom surface of the pressure bar 50 which actually contacts the web may be perforated or grid-like to reduce the amount of heat received from the previously heat-sealed stripes 46 and 48, respectively, after removal of the sealing bar 52 and to further facilitate the dissipation of incident heat. In this manner, the cooling of the heat-sealed stripes 46 and 48 which form the periphery of the ultimate envelope 64 is accelerated to quickly develop the ultimate bond strength of the seal, thereby reducing the operational cycle time as explained more fully, hereinafter.

During the operating cycle, the sealing head 22 moves from the first or starting position or station A to the second or sealing position B against the web 10, conveyor belt 20 and supporting bed or platen 40, and thence in unison with the web 10 and conveyor belt 20 as they advance under pressure, by suitable spring, air or hydraulic means associated with the head (not shown), against and along the platen 40 to the third or sealed position C. It is noted that the conveyor belt 20 could be made rigid enough to serve as a sealing platen eliminating the requirement for a separate platen 40. Thereafter, the head 22 may retract from the web 10 and return directly by a curvilinear or other path (not shown) to the sealing position B to start a new short cycle or travel to retracted position D and thence to the starting position A to begin a new cycle. Alternately, the head 22 may move from the starting position A to the sealing position B, and after a sufficient dwell period against the web 10 to accomplish sealing, return directly to the starting position A. Although the pressure bar 50 and the sealing bar 52 depend from the head 22, they are so designed as to also move independently of each other and head 22 during the operating cycle. For example, in the embodiment illustrated in FIGURE 1, the pressure bar 50 moves down substantially in unison with or independently of the sealing head 22 to first pull, internally strain, and tightly press or form-fit the upper half of the folded web 10 including the upper marginal portion 30 around the filler material or insert 36 and against the opposed, complementary lower half of the folded web 10 including the lower marginal portion 32, along the stripes 46 and 48 to retain the adjacent opposed surfaces in contacting relationship while the sealing bar 52 moves down substantially in unison with or independently of the pressure bar 50 and sealing head 22 to heat-seal said surfaces together along the stripes 46 and 48 immediately alongside the outside of the bar 50 which remains under pressure against the now-sealed web 10 while the sealing bar 52 retracts and returns directly to position A or advances to position B substantially in unison with or independently of the head 22, as described earlier, and thence by the alternate positions or stations described for the cycle of the head 22 to the starting position A to begin a new cycle. After the predetermined time dwell mentioned to permit the fused or heat sealed surfaces to cool sufficiently to develop a relatively strong heat seal, the pressure bar 50 retracts and returns to position A or advances to position B in unison with or independently of the head 22, and thence by the alternate positions or stations described for the cycle of the head 22 to begin a new cycle.

From the foregoing description, the importance of the relationship between the operation of the sealing bar 52, the pressure bar 50 and the refrigerating means 62 to rapidly accomplish a strong, tight, heat-sealed envelope unit 64 is apparent. Although refrigerated jaws have been used as platens to receive heat sealing bars or wires, there was no concern with removing heat from a pressure bar operating proximate heat emitting sealing bar or dwelling under pressure against an area immediately adjacent and contiguous to a heat sealed area which naturally emits heat. Nor has there been a primary concern as with the present invention to accomplish a relatively tight, form-fitting seal around the periphery of a relatively flat insert wherefor it is required that the seal rapidly develop maximum bond strength to resist the normal expansion of an insert tightly confined within a web which has been pulled, internally strained and tightly pressed or form-fit around such insert before sealing, as disclosed herein. The operation of the embodiment illustrated in FIGURES 3 and 4 is substantially the same as described for the embodiment in FIGURES 1 and 2, with the exception that opposed, twin webs 10 and 10' are brought into overlying relationship and sealed along three stripes by U shaped instrumentalities illustrated and described hereinbefore, owing to the absence of the edge fold 16 of the single web 10 used in FIGURE 1 which does not require sealing.

Referring now to the embodiments illustrated in FIGURES 5 and 7 the function and operation of such heater and feeder rolls 28 are well understood, consequently a detailed discussion thereof has been omitted. It is considered sufficient only to identify the circumferentially spaced, transversely extending surfaces 66 and the opposed circumferential surfaces 68 as heater elements which may be heated by any suitable means such as the current source 70 to the proper temperature required to soften the registering stripes 46 and 48 of thermoplastic film such as polyethylene or polypropylene. Alternately, corresponding potentially adhesive, thermoplastic-coated stripes on any supported or non-thermoplastic film such as cellophane may be heat activated and subsequently permanently united by means of the pressure bars 50, illustrated in FIGURES 5 and 7, respectively, and described in detail hereinbefore. To separate the thus formed individual envelope units 64, known trimming means 72 in FIGURE 5 may be incorporated in the other embodiments herein.

In FIGURE 6 an L shaped heat sealing wire or bar 74 is disposed below the upper half of the folded web 10 to heat activate spaced L shaped inner lines or areas corresponding with the stripes 46 and 48 (not shown), to be thereafter adhesively, permanently united with opposed, corresponding inner lines or areas in the lower half of the web 10 by the pressure bar 50 as in earlier described embodiments. Inserts 36 may be synchronously fed by an inserter (not shown) into the folded web 10 and be restrained by a guide 44 (not shown) before it reaches the bar 74 or after heat activation from a stack 36' (shown in phantom) when a heat sealing bar 74' (shown in phantom) is disposed above the lower half of the folded web 10. Thus, upper, lower or both opposed, corresponding areas may be heat activated while the web 10 is traveling or during a hiatus to accomplish subsequent sealing as desired.

For convenience of illustration, guide 44 is not shown in the embodiment in FIGURE 7 which also incorporates a suitable roll stock guide 76 disposed along the marginal or edge portions 30 and 32 of the traveling web 10 to deflect and maintain said portions outwardly in an open position to permit entry therebetween of a reciprocating heat sealing wire or bar 78 which operates in synchronism with the feeder rolls 28 and the pressure bar 50 to heat activate the now exposed, adjacent inner surfaces of said edge portions to accomplish sealing according to the hereinbefore described method. Although the heat sealing bar 78 as illustrated is provided with suitable means (not shown) to bring it into contact with both edge portions 30 and 32 before they reach the pressure bar 50, it is possible for the bar 78 to heat activate the inner surface of only one edge portion at any point along the path of the web 10 and preferably at a point, or along a line proximate the sealing position B of the head 22 (not shown) to permit the pressure bar 50 to move into said sealing position B immediately following retraction of said bar 78 to thereby unite said adjacent inner surfaces while they are still relatively hot and soft before cooling and setting takes place. Owing to the novel, foregoing method and technique, it is possible to maintain or periodically activate the sealing bar 78 at a lower temperature, limit the depth of heat activation or softening of the inner surfaces of said edge portions and still make a strong seal therebetween.

This same technique, which comprises heat activating an inner surface of a traveling or periodically stationary web immediately proximate pressure sealing means, may also be practiced with the embodiment illustrated in FIGURE 6 wherein the relatively thin heat sealing wire or bar 74 may be positioned immediately alongside or substantially beneath the pressure bar 50 at the sealing position B and be depressed into the upper resilient surface of a conveyor belt 20 or be received within a mating recess 80 in the bar 50 as the latter comes down into sealing engagement with the web 10. Accordingly, as the thus united web 10 continues its forward travel, under pressure of the bar 50 or after a predetermined dwell, as described earlier, it pulls away from the intermediately disposed sealing bar 74 and advances in synchronism with the other operating instrumentalities.

It follows, therefore, that the embodiments in FIGURES 6 and 7 are capable of producing a succession of envelope units 64 using a relatively thin film of plastic such as polyethylene or polypropylene owing to the maintenance of maximum integral film strength by use of limited temperature and heat penetration according to the described method and technique. Moreover, it is known that with polypropylene, although sufficient envelope and seal strength are possible with extremely thin films, the unoriented molecular crystallization which occurs due to the concomitant heating of the film in the zones immediately adjacent the heat sealed stripes reduces the strength of the film along said zones and thus also reduces the effective overall film strength of the envelope bringing about a requirement for the use of a thicker film initially, whereby overall costs are increased. It becomes clear therefore, that by use of the method and technique of applying controlled heat to a limited depth on an inner surface to be sealed, such weakening molecular crystallization is limited both in the area of the sealed stripes and in the zones immediately adjacent thereto.

In all the embodiments herein, it is also possible to use known ultra-sonic or electronic means to induce heat in the web or film to be sealed without heating or using the heat sealing bars 52, 74 or 78 in the respective embodiments, although the cost of incorporating such means operable according to the method of the invention would not be economical.

Although the pressure bars 50 in each of the embodiments has been illustrated in the solid form, it is possible for the under surface to be contoured to form fit the edge of a specific insert to be enveloped to facilitate the pulling of the film or other envelope material tightly around the insert. Moreover such undersurface may be resilient and the bar 50 itself resiliently urged into engagement with the web 10 to accomplish sealing more effectively. The pressure means illustrated may also take the form or rollers operable in intermittent or continuous engagement with the web 10 to serve substantially the same function as the bars 50 and also serve to smoothen the film or other material around the insert as it rolls thereover. Suitable electric or electronic means may also be employed to eliminate prevailing or induced static charges between portions of the web and between the web and the insert to facilitate the formation of a smooth, wrinkle-free, tight envelope. Moreover, although in each embodiment a single pressure bar has been illustrated, it is also possible to provide dual heads operable in a similar manner at a predetermined distance along the web and cooperating substantially simultaneously around a single, or multiple inserts. Where the head also incorporates a heating or sealing bar, the above mentioned dual head (not shown) may also incorporate a corresponding heating bar to substantially simultaneously heat and press the web portions together around remote ends or edges of a single or multiple inserts.

A suitable imprinter (not shown) may be incorporated in the head 22 to print return address, handling instructions and indicia directly onto the web material or to heat seal or otherwise adhesively affix an appropriate label thereto. Known punch card, presorted tapes or other address relating means (not shown) may be used in conjunction with the head 22 to feed appropriate address information or preprinted labels for positioning by electric eye or other suitable means (not shown) and proper affixing to the web material.

It will be obvious to those skilled in the art that various changes may be made without departing from the spirit of the invention and therefore the invention is not limited to what is shown in the drawings and described in the specification but only as indicated in the appended claims.

What is claimed is:

1. Apparatus for making and filling envelopes or the like, comprising means to advance overlying portions of envelope material having transversely extending, potentially adhesive, heat sealable, inner surfaces at predetermined stripes along the longitudinal extension of said portions, means to insert a succession of relatively flat inserts between said portions whereby said stripes border the transverse edges of each insert, heating means disposed between said portions to heat said surfaces, and pressure means disposed outside said portions to press said portions together along said stripes around each successive insert to form a series of filled envelopes, said pressure means being operable for a predetermined period of time after said heat and pressure sealing to permit cooling of the sealed portions under pressure to develop sufficient bond strength to prevent bursting after removal of pressure.

2. The structure recited in claim 1, and means to control said heating means to operate at a predetermined temperature to limit the depth of heat activation and softening of said inner surfaces and thereby reduce said cooling time and retain maximum integral strength of said surfaces.

3. Apparatus for making and filling envelopes or the like, comprising means to advance overlying portions of envelope material having longitudinally extending, potentially adhesive, heat sealable, inner surfaces at predetermined stripes along the longitudinal extension of said portions, means to insert a succession of relatively flat inserts between said portions whereby said stripes border the marginal, longitudinally extending edges of each insert, transversely reciprocable heating means operable proximate said stripes to rapidly heat said inner surfaces and retract therefrom, and pressure means operable outside said stripes to rapidly thereafter press said portions together along said stripes around each successive insert to form a series of filled envelopes, said pressure means being operable for a predetermined period of time after said heat and pressure sealing to permit cooling of the sealed portions to develop sufficient bond strength to prevent bursting after removal of pressure.

4. The structure recited in claim 3, and guide means to position said inner surfaces for contact with said heating means.

5. The structure recited in claim 3, and means to control said heating means to operate at a predetermined temperature to limit the depth of heat activation and softening of said inner surfaces and thereby reduce said cooling time and retain maximum integral strength of said surfaces.

References Cited

UNITED STATES PATENTS

| 2,565,444 | 8/1951 | Waters. | |
| 2,837,883 | 6/1958 | Bracey | 53—182 |
| 2,928,220 | 3/1960 | Kannengiesser et al. | 53—180 |
| 3,045,403 | 7/1962 | Mitchell | 53—182 X |
| 3,050,916 | 8/1962 | Gausman et al. | 53—182 |

FOREIGN PATENTS

| 214,307 | 5/1957 | Australia. |

GRANVILLE Y. CUSTER, JR., *Primary Examiner.*